United States Patent [19]
Cerekas

[11] 4,181,920
[45] Jan. 1, 1980

[54] MAGNETIC TICKET ENCODING TRANSPORT

[75] Inventor: Allen Cerekas, San Diego, Calif.

[73] Assignee: Cubic Western Data, San Diego, Calif.

[21] Appl. No.: 890,463

[22] Filed: Mar. 27, 1978

[51] Int. Cl.² .................. C11B 15/00; G06K 7/08; C06K 13/00; G11B 21/22
[52] U.S. Cl. ........................ 360/88; 235/449; 235/475; 360/2; 360/105
[58] Field of Search ................. 360/88, 2, 105; 235/449, 475, 483, 485

[56] References Cited
U.S. PATENT DOCUMENTS

| | | | |
|---|---|---|---|
| 2,940,663 | 6/1960 | Fechter et al. | 235/475 |
| 3,025,771 | 3/1962 | Uchida | 235/475 |
| 3,986,206 | 10/1976 | Fayling | 235/449 |
| 4,004,136 | 1/1977 | Torok et al. | 360/2 |
| 4,040,097 | 8/1977 | Mizumo | 360/2 |

*Primary Examiner*—Daryl W. Cook
*Attorney, Agent, or Firm*—Brown & Martin

[57] ABSTRACT pg,1 A magnetic ticket encoding transport for carrying tickets having a centered magnetic portion, in which tickets are sandwiched between pairs of movable belts that are pinched together for exact positioning at the point of contact with magnetic heads, including positive acting alignment plates that align the tickets while being held and moved by the belts to the magnetic heads, and which belts are so arranged in spaced pairs to provide an open centered channel for the magnetic portion of the ticket to align and co-act with the magnetic head.

10 Claims, 6 Drawing Figures

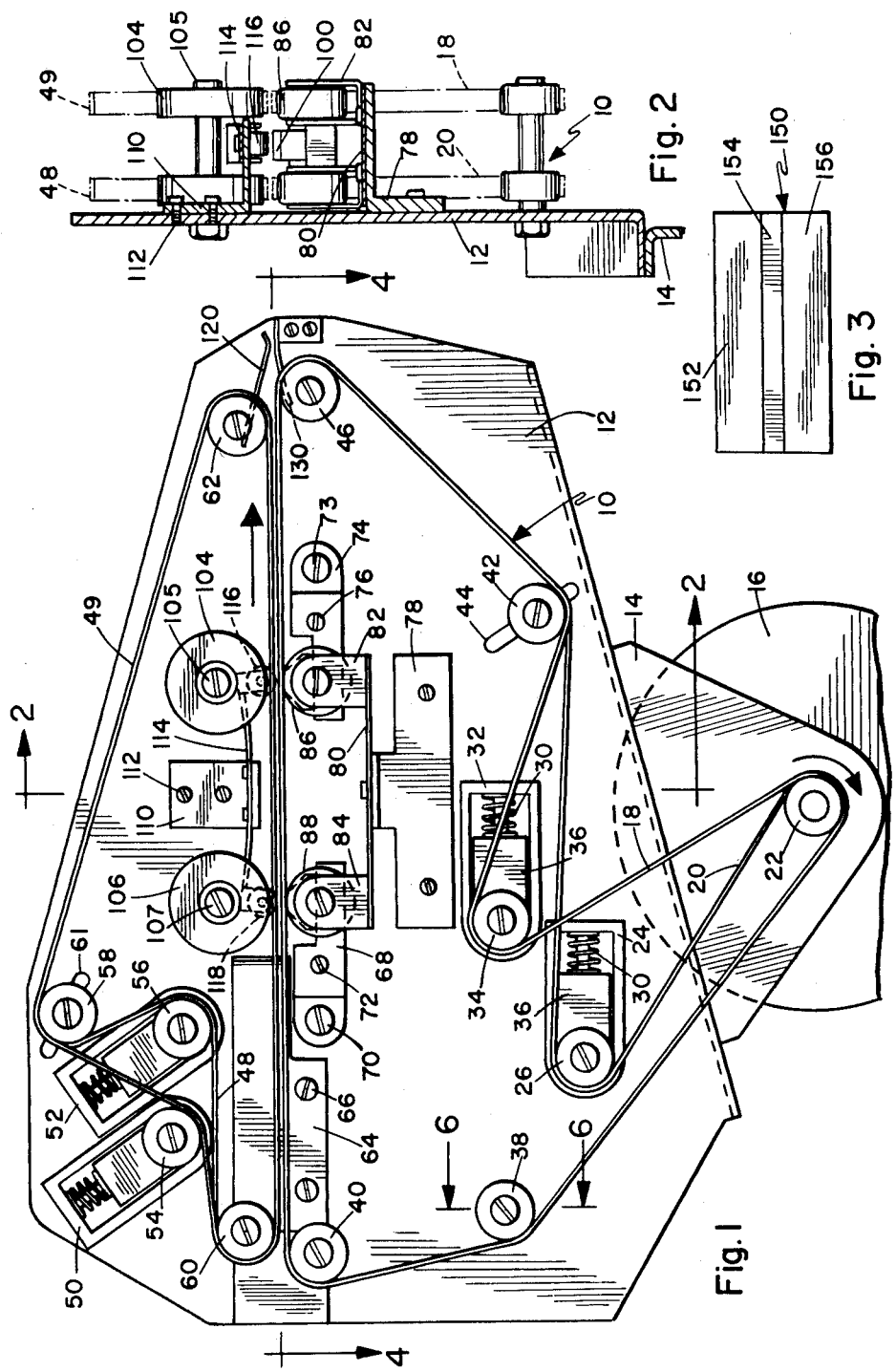

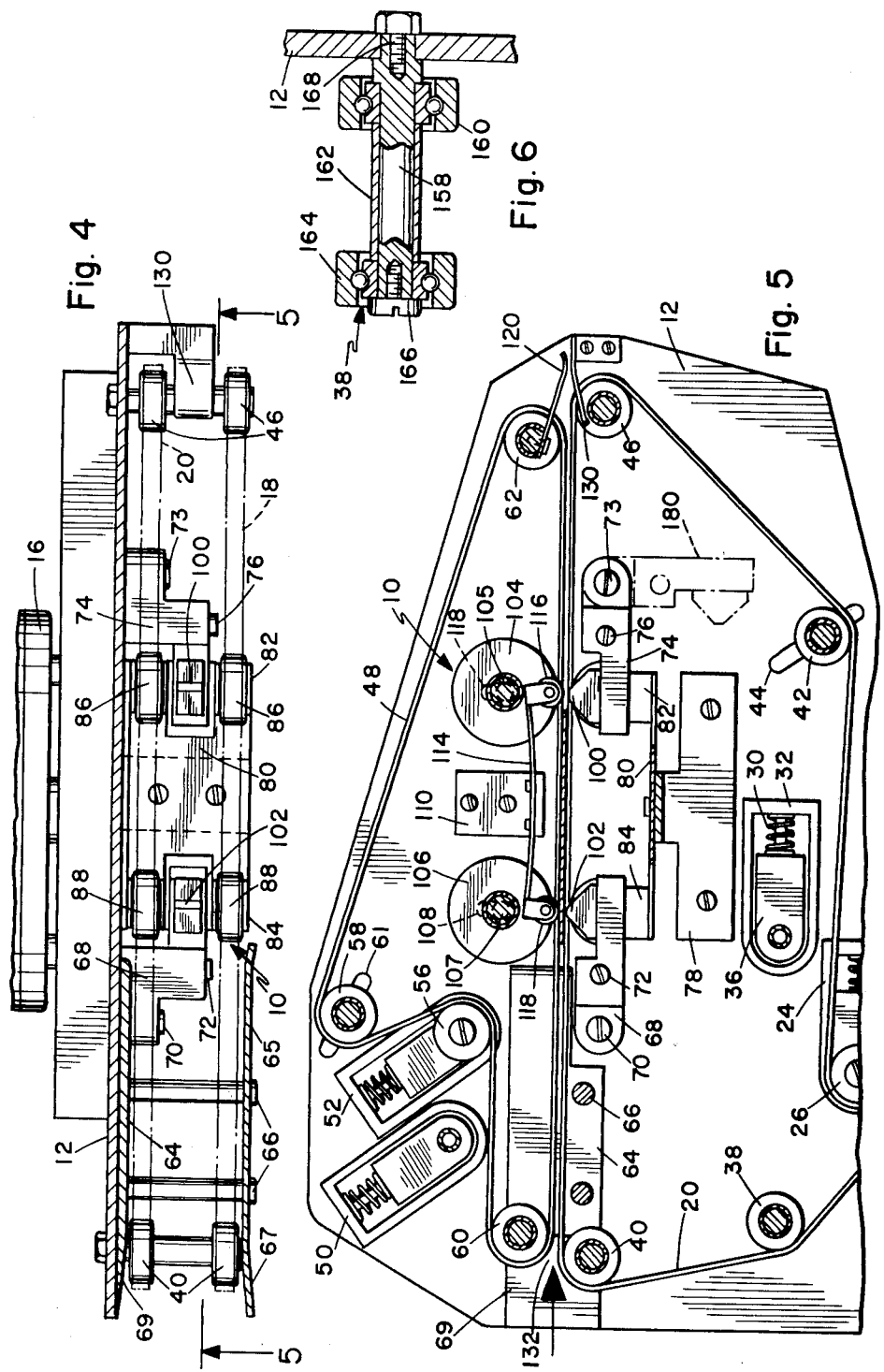

MAGNETIC TICKET ENCODING TRANSPORT

BACKGROUND OF THE INVENTION

Major transportation systems now use tickets that are coded for fare collection for a number of trips. Thus, multiple fare payments for rides on trains, subways, buses or the like, may be handled by the purchase of one ticket. This avoids the necessity of individual money and coin transactions with each ride, and reduces robbery problems and eases time delays for such transactions in moving passengers onto and off of the conveyances.

Such systems, however, require that tickets be processed and reprocessed for individual fare determination and collection from the composite amount of fare paid on each ticket. This requires ticket handling mechanism that receive the ticket, process the ticket for admittance to one or more fares, deducts the fare from the ticket, and returns the ticket to the user or owner.

The handling of such tickets and the processing of the information thereon, which may be magnetic information, requires a ticket handler and processor that is capable of quickly and efficiently handling a large number of tickets. This means receiving the tickets from the ticket holder at skewed angles, and moving the ticket in an efficient and aligned manner across magnetic heads, and to do this without jamming or creating other problems.

It is therefore advantageous to have a ticket handler that is capable of accepting tickets that may be off line, and yet will align the tickets in passage through the ticket handler, and that will move the tickets efficiently and rapidly through the ticket handler while aligning and holding in alignment the magnetic information thereon with magnetic reader and encoding heads.

SUMMARY OF THE INVENTION

In an illustrative embodiment of this invention, a magnetic ticket encoding transport is provided for carrying tickets having opposite sides and a centered magnetic portion. Movable belt means are used that include spaced pairs of upper and lower aligned movable belts. These belts are pinched together at entry and exit from the transport or handler, and grip the opposite sides of the tickets and move the tickets through the handler. The belts are laterally spaced, providing an aligned, space channel through the handler. So the magnetic portion of the ticket is open between the aligned belts, and is moved across the magnetic heads in aligned succession, providing reading and encoding of the magnetic information on the tickets.

Since the belts grip the tickets on their opposite sides, the tickets may move rotationally in their sandwiched position between the belts. Alignment means are provided between pinching portions on the belts to align the tickets so that the magnetic portion is aligned to the magnetic head. Once the ticket is in the correct aligned position from the alignment means, it then moves in this controlled position through the magnetic reading and encoding section.

In the magnetic reading and encoding section, opposed rollers contact the belts therebetween and pinch the sandwiched belts in a manner to grip the ticket positioned therebetween. This holds the tickets and the belts at a given horizontal position relative to the magnetic reading heads. The vertical position of the rollers may be selectively adjusted to provide desired vertical positioning of the magnetic portion of the tickets relative to the magnetic head.

So a precise and aligned movement of the ticket through the mechanism is achieved while providing exact positioning of the magnetic portion in correct alignment to the magnetic head, while moving the ticket over the magnetic heads with the magnetic portion being open. This movement is provided without damage to the ticket or to the magnetic portion of the ticket and provides a relatively jam free transportation of the ticket through the mechanism, and yet the mechanism is open on one side to immediately relieve jammed tickets, should they occur.

It is therefore an object of this invention to provide a new and improved magnetic ticket encoding transport.

Other objects and many advantages of this invention will become more apparent upon a reading of the following detailed description and an examination of the drawings, wherein like reference numerals will designate like parts throughout and in which:

FIG. 1 is a side elevation view with parts broken away of a preferred embodiment of the invention.

FIG. 2 is a sectional view taken on line 2—2 of FIG. 1.

FIG. 3 is a top plan view of a ticket used in the embodiment, with a magnetic strip.

FIG. 4 is a sectional view taken along line 4—4 of FIG. 1.

FIG. 5 is a sectional view taken along line 5—5 of FIG. 4.

FIG. 6 is a sectional view taken along line 6—6 of FIG. 1.

Referring now to the drawings and to FIGS. 1 and 5, the magnetic ticket encoding transport 10 is mounted on a metal plate 12. This plate 12 may be secured in an enclosed housing as may be desired, and mounted on a pedestal or the like. A connected portion 14 supports a motor 16 that drives a belt pulley drive 22. The pulley drive 22 can have crowned drive wheels to maintain the alignment of the respective lower drive belts 18 and 20.

The transport handler uses two upper endless belts 48 and 49 and two lower endless belts 18 and 20. The lower pair of belts move on pairs of idler rollers and tensioning rollers 38, 40, 88, 86, 46, 42, 34 and 26. FIG. 6 illustrates the construction of a typical idler roller pair 38. A central shaft 158 is held rigidly by a screw member 168 to the base plate 12. A spacer 162 provides spacing between the bearings and wheels 160 and 164. A screw member 166 holds the structure together. Thus, the respective belts roll on independent rollers 160 and 164. Each of the particular idler rollers has this construction, except that certain of the rollers will have a crowned center portions to maintain the alignment of the respective belts.

The position of roller sets 42 are set in the slot 44 to take up the correct slack in the endless belts 18 and 20. The tensioning rollers 26 and 34 are held by holder members 36 in enclosures 24 and 32; and are spring biased, for example by a spring 30, to provide resilient tensioning to the respective belts 18 and 20.

The rollers 86 and 88 are held by upright members 82 and 84 that are positioned on a leaf spring 80 that is fixed to side plate 78 that is in turn attached to support plate 12. So leaf spring 80 biases the respective rollers 86 and 88 upwardly against the lower belts 18 and 20. The endless belt members 18 and 20 are driven by drive pulley 22 and motor 16 and are rotated and move in a clockwise direction. Belts 48 and 49 are driven by belts 18 and 20. The belts have a spaced alignment as illustrated in FIGS. 2 and 4.

The upper belt members 48 and 49, see FIGS. 1 and 5, are similarly supported by pairs of idler rollers 60, 106, 104, 62, 58, and spring biased rollers 54 and 56 are positioned in the respective holders 50 and 52. The pin supports for rollers 58 are movable in slot 61 to take up slack. Similarly, the fixed position of rollers 104 and 106 is vertically adjusted by moving respective pins 105 and 107 vertically in slots 108. The vertical adjustment of the respective rollers 104 and 106 provide vertical height adjustment of the ticket in moving through the path in the belts, to provide correct height alignment with the respective magnetic heads, as will be more evident hereinafter.

The magnetic ticket, see FIG. 3, has opposite side portions 152 and 156 and a centered magnetic strip 154. This ticket is placed into space 132 with the magnetic portion 154 being aligned with the space between the respective belts, and with the magnetic portion being down.

The magnetic ticket is pinched by respective rollers 40 and 60 between belts 18, 20, 48 and 49 and is carried by the moving belts through the magnetic ticket encoding transport. The pinching and idling wheels 40 and 60 are offset longitudinally to provide a receptive opening upwardly between the belts for receiving the tickets. The user merely places the end of the ticket on the lower belts 18 and 20 and it is drawn into the aligned position within the belts.

Immediately adjacent rollers 40 and 60 are two side plates 64 and 65, see FIG. 4. These side plates 64 and 65 are secured by bolts 66 in the aligned position and to the support plate 12. As the tickets move between the alignment plates 64 and 65, they are caused to be aligned by the converging end portions 67 and 69 to the section of the plates where the width spacing is only slightly larger in spacing width than the width of the tickets 150. Since the tickets are only gripped at their outer opposite edges by the respective belts, they may be rotated by the alignment plates 64 and 65 so that their magnetic strip 154 is aligned through the handler with the magnetic strip 154 being spaced in correct alignment between the belts.

The tickets 150 are then moved in their held position between the respective belts, see FIG. 5, to the position where the magnetic strip 154 passes over reading head 102 and the encoding head 100. The rollers 104 and 106 are vertically positioned to coact with the resiliently biased rollers 86 and 88 to pinch the belt and the enclosed ticket 150 to a correct height alignment. This maintains the correct orientation of the magnetic surface 154 to the respective heads 100 and 102.

Spring bias rollers 116 and 118 are spring biased downwardly by a leaf spring 114 that is secured to bracket 110 that is secured to plate 12 by screws 112. The spring biased rollers 116 and 118 bias the center portion of the ticket 150 downwardly and the magnetic portion 154 into correct contact with the magnetic heads 100 and 102. The respective magnetic heads are supported on arms 68 and 74 that can pivot around pivot members 70 and 73. Screws 72 and 76 may be loosened to allow the respective magnetic head holders and magnetic heads to be pivoted downwardly, as illustrated at 180 in FIG. 5, for cleaning, inspection and replacement.

It may be noted that the spacing between the respective heads 100 and 102, and between the pinch rollers 104 and 106, is slightly smaller than the length of the tickets 150. So the tickets are held in the pinched condition during their passage over the magnetic heads. This maintains the correct alignment and spacing of the tickets between the belts in this critical area of movement. The longitudinal spacing between rollers 60 and 106 is longer than the length of the tickets 150, and accordingly the tickets are not in a pinched portion in moving through the respective alignment plates 64 and 65, and thus may be rotated laterally into alignment by plates 64 and 65.

The ticket 150 moves through to rollers 104 and is carried by the respective belt members 18, 20, 48 and 49 through the respective pinch rollers 46 and 62, where it then passes out through the vertical alignment plates 120 and 130 through the passage space 134. The ticket is held between the respective members 120 and 130, where it may be retrieved by the user.

In operation, the ticket 150 is moved through the transport 10 by the combination of four endless belts 18, 20, 48, and 49 on their associated rollers. The belts, for example, may be 6.35 MM wide and are located above and below the ticket 150 at its outer lengthwise edges 152 and 156. At the entrance and exit of transport 10 and at the magnetic heads 100 and 102, each pair of belts are pinched together with the ticket path between them. At the respective magnetic heads 102 and 100, this pinched positioning of the ticket is provided by rollers above the top belts and spring loaded rollers 86 and 88 below the bottom belts 18 and 20. At the transport entry and exit, the pinch is provided by staggering the upper rollers 60 and 62 from the lower rollers 40 and 46.

The belts are kept aligned by crowning some of the pulleys or rollers that they ride on. The transport power is provided by an electrical motor 16 that directly drives the two lower belts 18 and 20 through drive pulley 22. The upper belts 48 and 49 are driven by their contact with the two lower belts 18 and 20. Each of the four belts is provided with its own spring tensioner and each transport idler has an independent bearing. This allows each belt to act as independently as possible, thus isolating and minimizing drive transients. This belt and roller combination creates a situation where the ticket is driven and guided symmetrically by the belts from one set of pinch rollers to the next.

At the read and write stations, magnetic heads 100 and 102 are rigidly mounted between the belts and under the ticket path. Above the heads is a low inertia spring loaded pressure pad 114, 116 and 118 that keeps the ticket 150 in contact with the heads during reading or encoding. The spring force on the pressure pad is adjustable. On either side of each magnetic head 100 and 102 and above the top belts 48 and 49 are two rollers 104 and 106 on the same shaft but free to rotate separately on individual ball bearings. This shaft, and thus the top two rollers, is adjustable vertically. Below the bottom belts, on either side of each magnetic head 100 and 102 are two spring loaded rollers 86 and 88, both mounted on the same flat spring 80 but free to rotate independently on individual ball bearings. This combination of adjustable rollers above the top belts and spring loaded rollers below the bottom belts provides a positive ticket drive at the magnetic heads and because this pinch roller/belt combination determines the ticket path. The position of the ticket with respect to the head can be adjusted vertically to provide the best possible magnetic reading and writing.

An alignment station 64 and 65 is provided to align the ticket 150 after transport insertion and prior to magnetic encoding or reading. The normal interval between pinch rollers is approximately one ticket length (65 MM), but in the case of the alignment station, the interval is 91 MM. This additional length provides an area where the ticket is held only by the belts and can thus be guided laterally. This guiding is accomplished by driving the ticket 150 between two vertical sheet metal guides 64 and 65 that gradually funnel down to a width dimension of 0.25 MM larger than the largest ticket. These guides are positioned such that they align the ticket and guide it into the magnetic head station immediately down stream.

The ticket is easily accessible at all points in the transport. Ticket tracking is accomplished with solid state photosensors.

Having described my invention, I now claim:

1. A magnetic ticket encoding transport for transporting a ticket having opposite sides and a magnetic portion therebetween, comprising:
    movable belt means including at least a pair of laterally spaced upper and a pair of laterally spaced lower aligned movable belts for gripping the opposite sides of said ticket and moving said ticket with said belt means,
    said belts having an aligned space therebetween with the magnetic portion of the ticket moving in said aligned space,
    means for moving said belts along a given path,
    magnetic encoder means positioned in said path and in the aligned space for coacting with the magnetic portion of the ticket,
    and pinch means for pinching said belts together at the magnetic encoder means and positioning the magnetic portion of the ticket for operative contact with the magnetic encoder means in movement of the ticket in the given path, and
    alignment means for alignment of the ticket between said belts prior to reaching said encoder means along said path.

2. A magnetic ticket encoder transport as claimed in claim 1, wherein,
    said pinch means comprising a first pair of rollers positioned on one side of said belts with said rollers contacting said belts in substantial lateral alignment with the magnetic encoder means,
    a second pair of rollers positioned on the opposite side of said belts, and means for resiliently biasing said second pair of rollers against said belts in substantial alignment with said first rollers and said magnetic encoder means, thereby pinching said belts together against the ticket sandwiched therebetween at the location of the magnetic encoder means.

3. A magnetic ticket encoding transport as claimed in claim 1, wherein:
    said pinch means comprising a first set of two pairs of rollers for contacting the upper side of said belts at first and second locations along said given path,
    a second set of two pairs of rollers for contacting the lower side of said belts on the opposite side thereof at the same location of said first set of two pairs of rollers,
    said second set of rollers being resiliently biased to pinch the belt therebetween,
    and said magnetic encoder means comprising first and second magnetic heads positioned at the location that said rollers contact said belts.

4. A magnetic ticket encoding transport as claimed in claim 3, including;
    means for vertically moving said first set of two pairs of rollers for selectively adjusting the vertical positioning of said belts and the moving tickets therebetween relative to the magnetic encoder means.

5. A magnetic ticket encoding transport as claimed in claim 4, including,
    said magnetic encoder means comprising first and second magnetic heads,
    respective pivoting arms for supporting said first and second magnetic arms,
    and means for fixing said arms in selective pivotal positions relative to said belts.

6. A magnetic ticket encoding transport as claimed in claim 1, wherein:
    second pinch means including pairs of opposing rollers positioned at the entrance end of the given path for pinching said belt means,
    and said rollers comprising an upper pair of rollers and a lower pair of rollers with each pair of rollers being positioned on opposite sides of said belts,
    one of said pair of rollers being slightly offset along the path of said belts from said other pair of rollers,
    and means for resiliently biasing one of said pair of rollers towards the other of said pair of rollers.

7. A magnetic ticket encoding transport as claimed in claim 6, including:
    third pinch means comprising a first pair of upper pinch rollers and a pair of lower pinch rollers with said pinch rollers being positioned on oppposite sides of said belt means and coacting therewith,
    said pinch rollers being positioned at the end of said given path with the upper pinch roller being offset from the lower pair of pinch rollers,
    said resilient bias means for biasing one pair of said pinch rollers toward the other pair of pinch rollers.

8. A magnetic ticket encoding transport as claimed in claim 7, wherein:
    said movable belt means comprising a pair of upper belts and a pair of lower belts,
    each of said belts comprising an endless belt, tensioning roller means for maintaining tension of said belts, adjustable idler means for maintaining a continuous rotational movement of said belts thereon,
    and said moving means comprising a motor driven drive pulley means for driving one of said pairs of belts with the contact between said belts in said pinch means providing the rotational drive force to the other pairs of belts.

9. A magnetic ticket encoding transport as claimed in claim 1, wherein:
    said pinch means comprising two pairs of upper rollers and two pairs of lower rollers that are positioned on each side of said belts with said pairs of rollers being aligned to rollably pinch the belts therebetween,
    said magnetic encoding means comprising at least a pair of magnetic heads positioned adjacent said pairs of opposing rollers,
    second pinch means positioned at the entrance of said given path having a pair of upper rollers and a pair of lower rollers that bring said belts together in alignment at the start of said given path, the spacing between said two pairs of rollers of said first pinch means being a distance less than the length of the ticket, the spacing between said second pinch means and said first pinch means being a distance greater than the length of said ticket, said alignment means comprises guide means positioned on each side of said moving belts between said first pinch means and said second pinch means for aligning the ticket in position between said respective pairs of belts so that the magnetic portion is in alignment with the magnetic encoder means in the aligned space.

10. A magnetic ticket encoder transport as claimed in claim 9, wherein:

said alignment guide means comprising a pair of vertical plates individually positioned on each side of said belts, which plates contact the sides of the ticket in its gripped position between said pairs of moving belts and aligns it by direct contact.

* * * * *